United States Patent [19]

Pasto., deceased et al.

[11] Patent Number: 5,162,299

[45] Date of Patent: Nov. 10, 1992

[54] PREPARATION OF SUPERCONDUCTING OXIDE PRECURSOR MATERIALS BY PYROLYSIS FROM CONCENTRATED NITRIC ACID SOLUTION

[75] Inventors: Antonio C. Pastor, deceased, late of Manhattan Beach, Calif., by Ricardo C. Pastor, executor; Luisa E. Gorre, deceased, late of Camarillo, Calif., by M. Efren Gorre, administrator

[73] Assignee: Hughes Aircraft Company, Los Angeles, Calif.

[21] Appl. No.: 627,792

[22] Filed: Dec. 14, 1990

[51] Int. Cl.$^5$ .................. C01F 17/00; H01L 39/12
[52] U.S. Cl. .................. 505/1; 505/737; 505/815; 505/738; 252/518
[58] Field of Search .......... 505/1, 737, 615, 738; 252/518, 521; 423/593

[56] References Cited

U.S. PATENT DOCUMENTS

| | | | |
|---|---|---|---|
| 4,895,832 | 1/1990 | Chang et al. | 505/737 |
| 4,959,347 | 9/1990 | Kobayashi et al. | 505/782 |
| 4,996,189 | 2/1991 | Kourtakis et al. | 505/737 |
| 5,001,107 | 3/1991 | Bunker et al. | 505/738 |

FOREIGN PATENT DOCUMENTS

| | | | |
|---|---|---|---|
| 02-97219 | 12/1988 | Japan | 505/737 |
| 01-02119 | 4/1990 | Japan | 505/738 |

OTHER PUBLICATIONS

Rambabu, "An Efficient Combustion Process for Synthesis of $YBa_2Cu_3O_7$", J.J.A.P. vol. 29, No. 3, Mar. 1990, pp. 507-508.

Varma et al., "Metal-Nitrate-Urea Decomposition Route for Y-Ba-Cu-O Powder", J. Am. Cer. Soc. 73(10), 3103-3105, Oct. 1990.

Liu et al., "Homogeneous Coprecipitation As a Means Toward High-Tc and Sharp-Transition $YBa_2Cu_3O_{7-x}$ Sup. Oxides", Inorg. Chem. 28(1), Jan. 1989.

Keller et al, "Superconductivity in $YBa_2Cu_3O_x$ for x Greater Than 7.0", Chem. High Temp. Sup., Sep. 1987.

Primary Examiner—Paul Lieberman
Assistant Examiner—Bradley A. Swope
Attorney, Agent, or Firm—E. E. Leitereg; P. M. Coble; W. K. Denson-Low

[57] ABSTRACT

A superconducting oxide precursor material is prepared by dissolving soluble compounds containing the non-oxygen elements of the oxide in concentrated nitric acid, in which a decomposing agent for the nitrate of the nitric acid selected from urea and sucrose and an oxidizing/reducing agent selected from hydrogen peroxide and ammonium nitrate have also been dissolved. The acid solution is concentrated by heating until the liquid component is pyrolyzed, leaving a superconducting oxide precursor material residue. The precursor material is produced with a relatively high oxidation state, but is normally further oxidized to reach a superconducting state.

8 Claims, No Drawings

PREPARATION OF SUPERCONDUCTING OXIDE PRECURSOR MATERIALS BY PYROLYSIS FROM CONCENTRATED NITRIC ACID SOLUTION

BACKGROUND OF THE INVENTION

This invention relates to the preparation of high temperature superconducting oxide precursor materials, and, more particularly, to a coprecipitation technique that simultaneously forms and oxidizes the oxide.

One of the most important scientific advancements of recent years has been the discovery of materials that exhibit superconductivity at relatively high temperatures. In the superconducting state, a material has no electrical resistivity, and excludes magnetic flux lines. These characteristics can be used to great advantage in a variety of electrical and other types of devices. Until the recent discoveries, the maximum temperature at which superconductivity was observed (the "critical temperature" or $T_c$ of the material) was about 32K, which restricted the applications of the phenomenon to those wherein the material could be cooled to very low temperatures. The newly discovered types of high temperature nonmetallic superconductor materials in some cases have achieved the superconducting state above 77K, the boiling point of liquid nitrogen, and there exists the possibility of finding room temperature superconductors.

One of the important types of high temperature superconductors is complex oxides. For example, one class of the superconducting oxides is represented by the form $M_{2(1-x)}N_{2x}CuO_{4-y}$, where y is less than x. M is a Group IIIA element or a rare earth, N is a Group IIA element, and y is as small a positive number as possible. An illustrative member of this class of superconducting oxides is $La_{1.8}Sr_{0.2}CuO_4$. As used herein, a "high temperature oxide superconductor" is an oxide material of the form $AO_p$, having a superconducting critical temperature of the material greater than about 60K.

The effectiveness of these oxides as superconductors is highly dependent upon their method of preparation. The superconducting oxides were first prepared by mechanically mixing the non-oxide elements, usually presented in the form of compounds such as oxides or carbonates, heating and sintering the mechanical mixture at a sufficiently high temperature to form a precursor material having a content of a phase that is superconducting except for an oxygen deficiency, and then oxidizing the mixture.

The mechanical mixing approach, also termed the solid-state reaction method, is somewhat ineffective in achieving a complete mixture. It may produce extraneous phases during sintering, with the result that the final oxide may contain non-superconducting regions and have a superconducting transition temperature below that otherwise expected.

In another approach, the crystallization method, the non-oxide components are provided in the form of nitrates, and co-crystallized to form a homogeneous mixture. One version of this procedure utilizes nitric acid as the solvent. The crystallized material is pyrolyzed to form the precursor material, which is then oxidized as for the solid-state reaction method. The crystallization method produces a more intimate mix of the components during the precipitation step than does mechanical mixing, with the result that pyrolysis does not lead to as high a content of extraneous phases. The crystallization method can, however, result in inhomogeneities within the co-crystallized material, because some possible non-superconducting reaction products can form in preference to the phase which, after oxidation, is superconducting.

With either method for preparing the precursor material, the final step is oxidation. During sintering, oxygen is lost to the atmosphere, and the sintered precursor material would not exhibit the desired superconductivity. The oxidation step is necessary to raise the oxygen content to the correct value, so that the final material has the required oxidation states and stoichiometry. The oxidation treatment is conducted by placing the precursor material into a furnace operating at a temperature sufficiently high to attain oxidation. In the case of the compound $La_{1.8}Sr_{0.2}CuO_4$, for example, the heating and sintering temperature is about 900 C. and the oxidation temperature is about 500 C. The furnace atmosphere during oxidation is an oxygen-containing gas such as oxygen, air, or an oxygen/argon mixture. Oxidation has also been accomplished at lower temperatures using an oxygen plasma.

Although operable superconducting oxides have been produced by the approaches just outlined, they are time consuming and require multi-step processing at a range of elevated temperatures. During the various treatments, undesirable nonsuperconducting phases may form in preference to the superconducting oxide phase and be retained in the final product. There is therefore a continuing need for improved methods of preparing the superconducting oxides that are faster, more reliable, and avoid formation of extraneous phases. The present invention fulfills this need, and further provides related advantages.

SUMMARY OF THE INVENTION

The present invention provides a method for simultaneously forming a superconducting oxide precursor material having the correct ratios of non-oxygen elements and partially oxidizing the precursor material to a high oxidation state. The method is fast, achieving transport of elements through a liquid medium to sites where the precursor material is formed. The approach permits post-formation oxidation or other treatments, as desired.

In accordance with the invention, a process for preparing a superconducting oxide precursor material containing non-oxygen elements and oxygen comprises the steps of furnishing the non-oxygen elements, preferably in the form of compounds and most preferably as oxides; dissolving the non-oxygen elements into a solution of concentrated nitric acid, a decomposing agent for the nitrate of the nitric acid, and an oxidizing/reducing agent; and concentrating the nitric acid solution until the liquid phase pyrolyzes, leaving the superconducting oxide precursor material as a residue.

The present invention provides an important advance in the art of preparation of superconducting oxides, by permitting the superconducting oxide precursor material to be prepared at temperatures of 600 C. or less, and often at temperatures as low as 200-300 C. At such low temperatures, there is avoided the formation of undesirable extraneous high temperature phases that utilize the non-oxygen elements in a way that disrupts their availability for the stoichiometry of the superconducting oxide phase. Partial oxidation of the precursor material is accomplished during its formation, permitting an even higher oxidation state to be achieved during the subsequent oxidation treatment. Other features and advantages of the invention will be apparent from the following more detailed description of the preferred embodiment, which illustrates, by way of example, the principles of the invention.

DETAILED DESCRIPTION OF THE INVENTION

According to the invention, a process for preparing a superconducting oxide precursor material containing non-oxygen elements and oxygen comprises the steps of furnishing each of the non-oxygen elements in a source compound, each of the source compounds having at least one of the non-oxygen elements contained therein; dissolving the source compounds in a solution of concentrated nitric acid, a decomposing agent for the nitrates of the nitric acid, and an oxidizing/reducing agent; and heating the nitric acid solution until the liquid phase pyrolyzes, leaving the superconducting oxide as a residue.

In a preferred embodiment, a process for preparing a superconducting oxide precursor compound containing non-oxygen elements and oxygen comprises the steps of furnishing each of the non-oxygen elements in a source compound, each of the source compounds having at least one of the non-oxygen elements contained therein; dissolving the source compounds in a solution of concentrated nitric acid, a decomposing agent selected from the group consisting of urea and sucrose, and an oxidizing/reducing agent selected from the group consisting of hydrogen peroxide and ammonium nitrate; and heating the nitric acid solution until the liquid phase pyrolyzes, leaving the superconducting oxide precursor material as a residue.

The superconducting oxide may be written generally in the form $AO_p$, where A represents one or more elements other than oxygen. The term "non-oxygen element" is used to collectively describe all of these elements other than oxygen. (The elements other than oxygen are sometimes termed metallic elements in the scientific literature, but the more general term "non-oxygen element" is used herein to avoid any question as to whether elements such as rare earths should be termed metals.)

The non-oxygen elements are furnished in the form of compounds having complete solubility in the nitric acid. Operable compounds for the non-oxygen elements include their respective oxides, carbonates, and nitrates, with oxides being preferred for use in the approach of the invention. Normally, only one of the non-oxygen elements will be in each of the compounds, although some may be combined and furnished as complex compounds if the complex compound is fully soluble in the nitric acid.

Preparation of the superconducting oxide $La_{1.8}Sr_{0.2}CuO_{4-x}$, where x is as small as possible (including less than zero) and preferably less than 0.1, is described in detail as the preferred embodiment of the invention. The figures given herein are for preparation of a batch of about 20 grams, by way of example. The appropriate amounts of sources for the lanthanum, strontium, and copper are first weighed. The proper amounts of each source is the amount of the source that will give the proper atomic ratio of the elements in the final superconducting oxide. In the case of the preferred embodiment, the ratio of the lanthanum source to the barium source to the copper source is such that the atomic ratio La:Sr:Cu in the sources is 1.8:0.2:1. Here, the preferred sources are $La_2O_3$, $SrCO_3$, and CuO powder, which are provided in the indicated ratio. To achieve the proper ratio, the exact amounts of the powders are 14.66 grams of $La_2O_3$, 1.48 grams of $SrCO_3$, and 3.98 grams of CuO. These sources should be free of moisture and contaminants.

The source oxide powders are placed into a platinum crucible that is sufficiently large to contain the powders and the nitric acid solution. For preparation of about 20 grams of the superconducting oxide, a 250 milliliter capacity crucible has been used. There is no need to attempt to carefully mix the powders in the crucible.

The nitric acid preferably has a concentration at least 16M. The term "nitric acid" herein refers to $HNO_3$ dissolved in water, regardless of any dissociation of the molecule as is the case in most uses of acids.

In the preferred approach, to the crucible is added an amount of 16M nitric acid ($HNO_3$), diluted to 8M, sufficient to completely dissolve the source powders. In the exemplary case, about 200 milliliters of nitric acid was slowly added to the crucible. Since the solution is to be concentrated at elevated temperature, it is acceptable that the nitric acid be heated to increase the solubility of the products during the dissolution step.

A substance that reduces (decomposes) the nitrates of the nitric acid at elevated temperature is added to the crucible. The reducing agent makes the oxidation power of the nitric acid available at a relatively low temperature, instead of higher temperatures as would otherwise be the case. Preferred reducing agents are urea and sucrose. In the example under discussion, about 10–15 grams of urea or sucrose as the decomposing agent was added to the crucible prior to heating.

In the reaction that produces the superconducting oxide precursor material, the nitrate ($NO_3^-$) anion is an oxidizing agent and is thermally unstable to breakdown by pyrolysis. As the nitrate mix is heated, the oxidizing power of the nitrate burns the reducing agent at a low temperature, and then the nitrate ion is pyrolyzed to a nitrogen oxide or nitrogen and oxygen at a higher temperature.

The nitric acid is an oxidizer, due to the presence of the nitrate ions. To accelerate the oxidation and achieve an increased degree of oxidation, an oxidizing/reducing agent soluble in nitric acid is also added to the nitric acid, either before or after the source oxides and the decomposing agent are dissolved in the acid. Examples of operable adjunct oxidizing/reducing include hydrogen peroxide ($H_2O_2$) and ammonium nitrate ($NH_4NO_3$). The oxidizing/reducing agent acts as an oxidizer with respect to the reducing agents (e.g., urea or sucrose) but as a reducing agent with respect to $HNO_3$. In $NH_4NO_3$, $NH_4^+$ is reducing while $NO_3^-$ is oxidizing.

During pyrolysis of the nitric acid and formation of the superconducting oxide precursor material, the oxidizing/reducing agent maintains and increases the oxidation state of the oxides, so that the intended highly oxidized precursor compound is produced at a low temperature in preference to lower-valence intermediate oxides that are not superconducting (after the separate oxidizing treatment). In the present preferred example, about 5 grams of ammonium nitrate was added to the chemically decomposed nitric acid solution to promote oxidation.

The use of ammonium nitrate as the oxidizer yields particular benefits. It increases the viscosity of the nitric acid, thereby preventing premature crystallization of undesirable solid phases that would lead to inhomogeneity of the melt. As the metal nitrates form, the ammonium nitrate pyrolyzes to release a potent oxidizing agent, $N_2O$, which thence raises the oxidation state of the oxide as it forms. The pyrolysis reaction is also conducive to producing a precursor material that in turns results in a final calcined superconducting oxide powder with a high specific surface, which is useful for subsequent processing of the powder, as by sintering.

The nitric acid solution containing the oxidizing/reducing agent, the decomposing agent, and the source compounds for the non-oxide elements as solutes is pyrolyzed, preferably by heating at a temperature at or just above its boiling point. Nitric acid normally boils at about 86 C., but the boiling point of the solution is normally altered somewhat by the dissolved solutes. The nitrates in the melt boil or decompose by pyrolysis, leaving the superconducting oxide precursor material as a precipitated powdery residue. The precipitate is collected for further processing into useful shapes, as by sintering the powder.

During the concentration and formation of the compound having the correct ratio of the non-oxide elements (previously termed the "precursor compound"), the oxidizing melt simultaneously oxidizes the compound to a high oxidation state. The oxidation in the acid may be sufficient to raise the oxide to the highest possible oxidation state, as desired for high temperature superconductivity. In most cases, however, it is necessary to oxidize the solid after it is removed from the melt, and such post-formation oxidation is within the scope of the invention. The post-formation oxidation is accomplished by heating the compound in an oxidizing environment, as in the prior approaches.

In the example, the crucible with the nitric acid solution of the source compounds, the reducing agent, and the oxidizing/reducing agent was placed into a well-ventilated furnace in flowing air and heated to a temperature of about 600 C. for a period of time of about 15–20 minutes to form the superconducting oxide precursor compound, cooled to room temperature, and the residue ground into a powder. Four such cycles of heating and cooling are preferably employed, with the residue being reground between each cycle. At the conclusion of this treatment, the crucible had on its interior walls a black residue powder precipitate that is analyzed as $La_{1.8}Sr_{0.2}CuO_{4-x}$, where x is about 0.05. If desired, the oxidation state may be increased still further by a post-formation heat treatment performed by heating the solid oxide in a furnace to a temperature of about 500 C. for up to 10 hours in an oxygen atmosphere flowing at a rate of about 2 cubic feet per hour, and then cooling the powder to ambient temperature. Such a post-formation heat treatment is preferred to approach the theoretical limit of the oxidation state.

The $La_{1.8}Sr_{0.2}CuO_{4-x}$ powder is then ready for use as required. Neither it nor the ingredients has been heated above 600 C. At these temperatures, it is known that undesirable intermediate complex oxides are not formed in the concentrated nitric acid or the superconducting oxide precursor material, so that there is less likelihood of contaminating phases being present in the final superconducting oxide powder.

While not wishing to be bound by this possible mechanism of formation of the superconducting oxide precursor material, in the sequence believed to be operable the prior steps of formation of a precursor material and its partial oxidation are combined into this single step. The source powders $La_2O_3$, $SrCO_3$, and $CuO$ are fully soluble in the nitric acid. Upon concentration of the nitric acid, the various elements tend to form precipitates having the elements in the ratio of La:Sr:Cu:O of 1.8:0.2:1:4. This combination of elements results in the formation of a stable oxide precipitate nucleus in the melt, which grows over time with the addition of more material in the desired ratio. The presence of the oxidizing/reducing agent (here hydrogen peroxide or ammonium nitrate) induces a high oxidation state in the material, discouraging the formation of lower oxidation state, higher energy oxides that cannot be superconducting, even after further oxidation. Since the free energy of this compound is less than that of other possible oxides that are not superconducting, only this superconducting oxide is ultimately stable and remains as a precipitate in the melt.

The approach just described is for a particular superconducting oxide, group of source compounds, and oxidizing agent. Other superconducting oxides such as $YBa_2Cu_3O_{7-x}$ may be prepared. Other source compounds such as, for example, oxalates and acetates may be used.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for preparing a superconducting oxide precursor compound containing non-oxygen elements and oxygen, comprising the steps of:
   furnishing each of the non-oxygen elements in a source compound, each of the source compounds having at least one of the non-oxygen elements contained therein;
   dissolving the source compounds in a solution of concentrated nitric acid, a decomposing agent selected from the group consisting of urea and sucrose, and an oxidizing/reducing agent selected from the group consisting of hydrogen peroxide and ammonium nitrate; and
   heating the nitric acid solution until the liquid phase pyrolyzes, leaving the superconducting oxide precursor material as a residue.

2. The process of claim 1, including the further step, after the step of heating the nitric acid solution, of
   grinding the residue to a fine powder.

3. The process of claim 2, including the further step, after the step of grinding the residue, of
   heating the residue to further pyrolyze the residue.

4. The process of claim 3, including the further step, after the step of heating the residue, of
   repeating the steps of grinding the residue and heating the residue.

5. The process of claim 4, including the additional step, after the step of repeating the steps, of:
   heating the superconducting oxide residue at a temperature of less than about 500° C. to further oxidize the residue.

6. The process of claim 1, including the additional step, after the step of concentrating the nitric acid solution, of:
   heating the superconducting oxide residue at a temperature of less than about 600° C. to further oxidize the residue.

7. The process of claim 1, wherein the non-oxygen elements are furnished in a chemically combined form that is soluble in nitric acid.

8. The process of claim 1, wherein the precursor material is selected from the group consisting of $La_{1.8}Sr_{0.2}CuO_{4-x}$ and $YBa_2Cu_3O_{7-x}$.

* * * * *